United States Patent
Kuroki

(10) Patent No.: US 10,224,551 B2
(45) Date of Patent: Mar. 5, 2019

(54) SHEET FOR THIN LAYER TRANSFER, ELECTRODE CATALYST LAYER-CARRYING SHEET FOR THIN LAYER TRANSFER, METHOD FOR PRODUCING SHEET FOR THIN LAYER TRANSFER, AND METHOD FOR PRODUCING MEMBRANE ELECTRODE ASSEMBLY

(71) Applicant: NITTO DENKO CORPORATION, Ibaraki-shi, Osaka (JP)

(72) Inventor: Yuta Kuroki, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 6 days.

(21) Appl. No.: 15/027,955

(22) PCT Filed: Jul. 18, 2014

(86) PCT No.: PCT/JP2014/003822
§ 371 (c)(1),
(2) Date: Apr. 7, 2016

(87) PCT Pub. No.: WO2015/052860
PCT Pub. Date: Apr. 16, 2015

(65) Prior Publication Data
US 2016/0276676 A1    Sep. 22, 2016

(30) Foreign Application Priority Data
Oct. 11, 2013    (JP) .................................. 2013-213979

(51) Int. Cl.
*H01M 4/88*    (2006.01)
*B32B 27/30*    (2006.01)
(Continued)

(52) U.S. Cl.
CPC ........... *H01M 4/8814* (2013.01); *B32B 15/00* (2013.01); *B32B 15/04* (2013.01); *B32B 15/08* (2013.01);
(Continued)

(58) Field of Classification Search
None
See application file for complete search history.

(56) References Cited

U.S. PATENT DOCUMENTS

2002/0111402 A1* 8/2002 Mizuno ................ C09D 127/18
524/100
2003/0062644 A1* 4/2003 Oyama ................. B29C 43/003
264/41
(Continued)

FOREIGN PATENT DOCUMENTS

EP    1230705    4/2010
JP    2003-100807    4/2003
(Continued)

OTHER PUBLICATIONS

Machine Translation of JP 2007048701 (Year: 2007).*
(Continued)

*Primary Examiner* — Wyatt P McConnell
(74) *Attorney, Agent, or Firm* — Hamre, Schumann, Mueller & Larson, P.C.

(57) ABSTRACT

The present invention provides a sheet for thin layer transfer (10) including: a substrate (1) including a thin metal film or a thin heat-resistant resin film; and a fluorine resin layer (2) provided on at least one side of the substrate (1). The sheet for thin layer transfer thus provided can have reduced surface irregularities and be less prone to deteriorate even when subjected to repeated thermal transfer by thermocompression bonding.

12 Claims, 2 Drawing Sheets

(51) Int. Cl.
 B32B 15/00 (2006.01)
 B32B 15/04 (2006.01)
 B32B 15/08 (2006.01)
 B32B 27/00 (2006.01)
 B32B 27/06 (2006.01)
 B32B 27/08 (2006.01)
 B32B 27/32 (2006.01)
 H01M 8/1004 (2016.01)
 H01M 8/1018 (2016.01)
 B05D 1/18 (2006.01)
 B05D 3/00 (2006.01)

(52) U.S. Cl.
 CPC .............. *B32B 27/00* (2013.01); *B32B 27/06* (2013.01); *B32B 27/08* (2013.01); *B32B 27/30* (2013.01); *B32B 27/304* (2013.01); *B32B 27/322* (2013.01); *H01M 4/881* (2013.01); *H01M 4/8825* (2013.01); *H01M 8/1004* (2013.01); *H01M 8/1018* (2013.01); *B05D 1/18* (2013.01); *B05D 3/007* (2013.01); *B32B 2307/30* (2013.01); *B32B 2307/302* (2013.01); *B32B 2457/00* (2013.01); *H01M 2008/1095* (2013.01); *H01M 2300/0082* (2013.01)

(56) References Cited

U.S. PATENT DOCUMENTS

| 2004/0120737 | A1* | 6/2004 | Kataoka | G03G 15/2053 |
| | | | | 399/328 |
| 2008/0128074 | A1* | 6/2008 | Mah | B32B 37/025 |
| | | | | 156/182 |
| 2008/0187815 | A1 | 8/2008 | Hiromitsu | |
| 2008/0220306 | A1* | 9/2008 | Akiyama | H01M 4/8807 |
| | | | | 429/492 |
| 2010/0167159 | A1* | 7/2010 | Ono | C08F 297/00 |
| | | | | 429/483 |
| 2011/0262828 | A1 | 10/2011 | Noda et al. | |
| 2013/0045438 | A1* | 2/2013 | Haba | H01M 4/881 |
| | | | | 429/535 |
| 2014/0014400 | A1 | 1/2014 | Mori et al. | |

FOREIGN PATENT DOCUMENTS

| JP | 2003-285396 | 10/2003 |
| JP | 2006-100092 | 4/2006 |
| JP | 2007-048701 | 2/2007 |
| JP | 2007-103020 | 4/2007 |
| JP | 2008-103251 | 5/2008 |
| JP | 2008-226540 | 9/2008 |
| JP | 2009-080974 | 4/2009 |
| JP | 2010-073503 | 4/2010 |
| JP | 2010-257987 | 11/2010 |
| JP | 2013-073892 | 4/2013 |
| WO | 2012137923 | 10/2012 |

OTHER PUBLICATIONS

Extended European Search Report issued for corresponding European Patent Application No. 14853026.4, dated Apr. 19, 2017, 9 pages.

* cited by examiner

SHEET FOR THIN LAYER TRANSFER, ELECTRODE CATALYST LAYER-CARRYING SHEET FOR THIN LAYER TRANSFER, METHOD FOR PRODUCING SHEET FOR THIN LAYER TRANSFER, AND METHOD FOR PRODUCING MEMBRANE ELECTRODE ASSEMBLY

TECHNICAL FIELD

The present invention relates to a sheet for thin layer transfer for use in transfer of a thin layer made of a material such as a cell electrode material, and relates to a method for producing the sheet for thin layer transfer. The present invention also relates to an electrode catalyst layer-carrying sheet for thin layer transfer which includes the above sheet for thin layer transfer and an electrode catalyst layer stacked on the sheet. The present invention further relates to a method for producing a membrane electrode assembly using the sheet for thin layer transfer.

BACKGROUND ART

For example, a polymer electrolyte fuel cell employs a membrane electrode assembly (MEA) as its major component. The MEA is composed of an electrolyte membrane and electrode catalyst layers stacked on both sides of the electrolyte membrane. Each of these electrode catalyst layers may be stacked, for example, as a catalyst layer for an anode or as a catalyst layer for a cathode. A MEA including a diffusion layer stacked on the surface of an electrode catalyst layer is also preferably used. Thermal transfer is an often-used technique for stacking an electrode catalyst layer on an electrolyte membrane in such a MEA. Patent Literature 1 describes a method for consecutive thermal transfer of catalyst layers onto an electrolyte membrane in view of operation efficiency, the method including: forming a stack of a band-like electrolyte membrane and a catalyst layer-carrying film carrying a catalyst layer; passing the stack between a pair of thermal transfer rolls heated to a predetermined temperature; and then peeling off only the catalyst layer-carrying film. Patent Literature 2 describes a method for producing a MEA, the method including: joining an electrode catalyst layer, formed on a transfer sheet used as a substrate, to a polymer electrolyte membrane by hot press (heat press); and then peeling off the substrate. That is, this method performs thermal transfer of an electrode catalyst layer onto a polymer electrolyte membrane.

CITATION LIST

Patent Literature

Patent Literature 1: JP 2008-103251 A
Patent Literature 2: JP 2013-073892 A

SUMMARY OF INVENTION

Technical Problem

In the method as described above in which thermal transfer of an electrode catalyst layer onto an electrolyte membrane is performed, the performance of the sheet for thin layer transfer on which the electrode catalyst layer is stacked constitutes one of the factors determining the performance of the electrode catalyst layer and the production quality. In particular, electrode catalyst layers for MEAs have been required to have a further reduced thickness to meet the recent demand for size reduction of fuel cells. Such thickness reduction may pose the problem of transfer of the surface irregularities of a sheet for thin layer transfer onto an electrode catalyst layer, which phenomenon had not emerged as a problem previously. More specifically, the formation of a thin portion in the electrode catalyst layer may lead to the occurrence of electrical short circuit, and thus cause a decline in performance of the MEA and hence of the fuel cell. Additionally, techniques of control for electrode catalyst layers are becoming more refined, faster, and lower in cost, which creates a demand for a reusable sheet for thin layer transfer that does not deteriorate due to thermal transfer using thermocompression bonding and that is less prone to wobbling or elongation caused by conveyance between rolls. Sheets for thin layer transfer may be required to meet the same demands also when the sheets are for use in transfer of thin layers other than electrode catalyst layers.

It is therefore an object of the present invention to provide a sheet for thin layer transfer that has reduced surface irregularities, that is capable of withstanding heating and pressing, and that can be easily handled even when the thin layer to be transferred needs to be subjected to fine processing. It is also an object of the present invention to provide a method for producing such a sheet for thin layer transfer. The present invention also provides an electrode catalyst layer-carrying sheet for thin layer transfer which includes the above sheet for thin layer transfer and an electrode catalyst layer for use in a membrane electrode assembly of a fuel cell, the electrode catalyst layer being stacked on the sheet for thin layer transfer. The present invention further provides a method for producing a membrane electrode assembly using the above sheet for thin layer transfer.

Solution to Problem

The present invention provides a sheet for thin layer transfer, including: a substrate including a thin metal film or a thin heat-resistant resin film; and a fluorine resin layer provided on at least one side of the substrate.

The present invention provides an electrode catalyst layer-carrying sheet for thin layer transfer, including: the above sheet for thin layer transfer; and an electrode catalyst layer for use in a membrane electrode assembly of a fuel cell, the electrode catalyst layer being stacked on the sheet for thin layer transfer.

The present invention provides a method for producing a sheet for thin layer transfer, the method including: a step of providing a substrate including a thin metal film or a thin heat-resistant resin film; an immersion coating step of immersing the substrate in a dispersion of a fluorine resin; a heat drying step of, after the immersion coating step, heating a sheet including the substrate coated with the fluorine resin so as to remove a dispersion medium of the dispersion; and a sintering step of, after the heat drying step, heating the sheet at a temperature equal to or higher than a melting point of the fluorine resin.

The present invention provides a method for producing a membrane electrode assembly, the method including: a catalyst layer stacking step of stacking an electrode catalyst layer including at least a polymer electrolyte and catalytic material-supporting particles on the above sheet for thin layer transfer; an electrolyte membrane stacking step of bringing an electrolyte membrane into contact with the electrode catalyst layer stacked on the sheet for thin layer transfer; a thermocompression bonding step of bonding the electrode catalyst layer and the electrolyte membrane together by thermocompression; and a peeling step of peeling the sheet for thin layer transfer from the electrode catalyst layer.

DESCRIPTION OF EMBODIMENTS

Embodiments of the present invention will now be described with reference to the drawings. The following description relates to some examples of the present invention, and the present invention is not limited by the examples.

Figure 1:
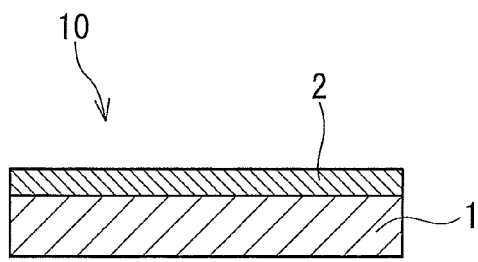
FIG. 1 is a cross-sectional view showing an example of the sheet for thin layer transfer of the present invention.
Figure 2:
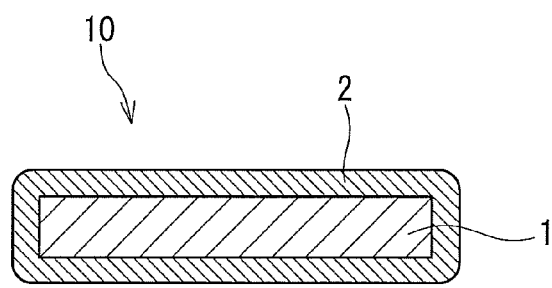
FIG. 2 is a cross-sectional view showing another example of the sheet for thin layer transfer of the present invention.
Figure 3:
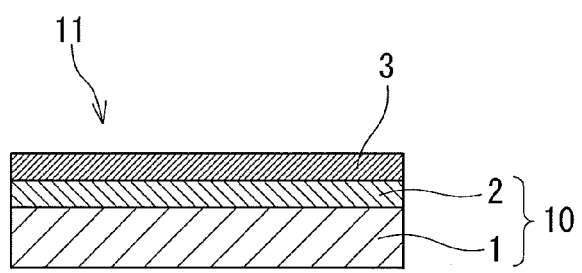
FIG. 3 is a cross-sectional view showing an example of the electrode catalyst layer-carrying sheet for thin layer transfer of the present invention.

The present invention relates to a sheet for thin layer transfer including a substrate that is a thin metal film or a thin heat-resistant resin film having at least one side coated with a fluorine resin. The fluorine resin layer may be so formed that a fluorine resin layer 2 is provided on one side of a as shown in FIG. 1 or that the fluorine resin layer 2 covers both principal sides and edges of the substrate 1 as shown in FIG. 2. This sheet for thin layer transfer, which is referred to as a sheet for thin layer transfer 10, can be used with a thin layer to be transferred, such as an electrode catalyst layer 3, being provided on the surface of the fluorine resin layer 2 as shown in FIG. 3. The thin layer to be transferred by means of this sheet for thin layer transfer is not particularly limited. For example, the layer is an electrode catalyst layer 3 to be stacked on a polymer electrolyte membrane 4 of a membrane electrode assembly (MEA) 5 shown in FIG. 4 which is for use in a polymer electrolyte fuel cell (PEFC).

As shown in FIG. 1 and FIG. 2, the sheet for thin layer transfer 10 includes the substrate 1 and the fluorine resin layer 2. The substrate 1 consists of a thin metal film or a thin heat-resistant resin film. The fluorine resin layer 2 is provided on at least one side of the substrate 1. It is preferable that, as shown in FIG. 2, the coating of fluorine resin be formed on both sides of the substrate 1. That is, the fluorine resin layer 2 is preferably provided on both sides of the substrate 1. In this case, thin layers to be transferred can be stacked on both sides of the sheet for thin layer transfer 10. For example, it is possible to stack and transfer a thin layer on and from one side of the sheet for thin layer transfer 10, and then stack and transfer a thin layer on and from the other side of the sheet for thin layer transfer 10. The provision of the fluorine resin layer 2 formed on both sides of the substrate 1 can improve the reusability of the sheet for thin layer transfer 10.

When the fluorine resin layer 2 is provided on both sides of the substrate 1, the fluorine resin layer 2 is formed so as to have two portions respectively provided on both sides of the substrate 1, the two portions being preferably connected to each other as shown in FIG. 2. That is, the edges of the substrate 1 which extend in the thickness direction of the substrate 1 are desirably coated with a fluorine resin. For example, it is preferable for the fluorine resin layer 2 to cover both sides of the substrate 1 and at least two portions of the edges of the substrate 1 which extend in the thickness direction of the substrate 1. The phrase "at least two portions of the edges of the substrate 1 which extend in the thickness direction of the substrate 1" as used herein may refer to, for example, two or more of the four edge faces of the substrate 1 of rectangular shape which extend in the thickness direction of the substrate 1. The phrase "at least two portions of the edges of the substrate 1 which extend in the thickness direction of the substrate 1", as the case may be, refers to two portions in one of the edge faces of the substrate 1 which extend in the thickness direction of the substrate 1. Forming a connection between the two portions of the fluorine resin layer 2 which are respectively provided on both sides of the substrate 1 makes the fluorine resin layer 2 less likely to be detached from the substrate 1. This can provide an increase in adhesion between the substrate 1 and the fluorine resin layer 2 and hence an improvement in durability of the sheet for thin layer transfer 10. In the sheet for thin layer transfer 10, the area of the exposed portion of the substrate 1 is small; thus, debris derived from the substrate 1 can be prevented from being present in an article produced using the sheet for thin layer transfer 10. When, for example, the substrate 1 is a thin metal film, metallic powder is likely to be derived from the substrate 1. In this case, both sides and edge faces of the substrate 1 are preferably coated with a fluorine resin.

The thin metal film used as the substrate 1 is not particularly limited. A thin stainless steel film or a thin aluminum film can be preferably used. The substrate 1 is more preferably a thin aluminum film, particularly in view of, for example, high resistance to alteration during heating, high thermal conductivity, low specific gravity, and easy availability. It is not preferable for a metal film as the substrate 1 to have too large a thickness because such a thick substrate 1 is difficult to convey between rolls and has a high thermal capacity causing an increase in the time required for conduction of heat in the sheet for thin layer transfer 10 during the production of a membrane electrode assembly or during the transfer of a thin layer. Thus, the thickness of the thin metal film as the substrate 1 is preferably 100 μm or less and more preferably 75 μm or less. Using too thin a metal film as the substrate 1 is likely to cause wrinkles in the sheet for thin layer transfer 10 and hence irregularities in the thin layer to be transferred during the production of a membrane electrode assembly, and makes the sheet for thin layer transfer 10 less likely to have a required level of tensile elastic modulus for fine processing of the thin layer to be transferred. Thus, the thickness of the thin metal film as the substrate 1 is preferably 30 μm or more and more preferably 50 μm or more. The reason why a thin metal film can be preferably used as the substrate 1 is that such a film shows a high thermal conductivity in thermocompression bonding during layer transfer.

The resin for the thin heat-resistant resin film used as the substrate 1 is not particularly limited, as long as it is a resin that is capable of withstanding a temperature (e.g., 350° C. or more) for heating and sintering of the fluorine resin forming the fluorine resin layer 2 and that is insoluble in a dispersion medium of a solution of the fluorine resin. Examples of such a resin include polyimide, polyetheretherketone, polyetherimide, polyphenylene sulfide, and polybenzimidazole. Alternatively, a thin film consisting of a fluorine resin itself, which will be mentioned later, may be used as the substrate 1. The resin for the thin heat-resistant resin film as the substrate 1 is preferably polyimide and particularly preferably aromatic polyimide in view of heat resistance and stability. That is, the substrate 1 is preferably a thin polyimide film. Various compounds can be used as a tetracarboxylic acid component and a diamine component of the polyimide. The linear expansion coefficient of the polyimide can be adjusted by the choice of the tetracarboxylic acid component and the diamine component.

The fluorine resin coating the substrate 1 and forming the fluorine resin layer 2 is not particularly limited, as long as the resin is one having high heat resistance and weather resistance and excellent in releasability from the thin layer to be transferred. Considering the actual performance of a film of fluorine resin alone conventionally used as the sheet for thin layer transfer 10, polytetrafluoroethylene (PTFE), tetrafluoroethylene-perfluoroalkyl vinyl ether copolymer (PFA), or tetrafluoroethylene-hexafluoropropylene copolymer (FEP) can be preferably used as the fluorine resin forming the fluorine resin layer 2. Among these, PTFE or PFA is more preferable, and PTFE is particularly preferable.

The fluorine resin is preferably mixed with a dispersion medium and used in the form of a dispersion. The dispersion medium is not particularly limited as long as it does not dissolve the fluorine resin and can be dried. It is preferable to use water as the medium in view of, for example, handleability. The concentration of the fluorine resin in the dispersion is about 30 to 70 weight %. The fluorine resin dispersion may contain two or more fluorine resins and may further contain various additives. Examples of the additives include a silicone surfactant and a fluorine surfactant aimed at improvement in hydrophilicity.

The fluorine resin layer 2 can be formed by heating and sintering a fluorine resin. PTFE is known to undergo a decrease in molecular weight under heating. It is thus preferable to use PTFE having a number-average molecular weight of 5,000,000 or more as the fluorine resin of the fluorine resin dispersion.

The thickness of the fluorine resin layer 2 on each side of the sheet for thin layer transfer 10 is preferably about 5 to 50 µm. The fluorine resin layer 2 having too small a thickness is likely to cause defects such as loss of a portion of the thin layer to be transferred. Thus, the thickness of the fluorine resin layer 2 is more preferably 10 µm or more. The fluorine resin layer 2 having too great a thickness is likely to cause large irregularities in the thin layer to be transferred. Thus, the thickness of the fluorine resin layer 2 is more preferably 40 µm or less.

The thickness of the sheet for thin layer transfer 10 is about 40 to 200 µm. In view of stiffness and ease of handling, the thickness of the sheet for thin layer transfer 10 is preferably 60 to 150 µm and more preferably 70 to 120 µm.

The method for producing the sheet for thin layer transfer 10 is not particularly limited as long as the method includes forming a layer of fluorine resin on a flat portion of at least one side of the substrate 1. The method used can be a commonly-known method. Examples of the method include: a method including applying a fluorine resin dispersion onto the substrate 1 with an application means such as a bar coater, a die coater, a spray coater, or an immersion bath and then performing drying and sintering; a method including bonding a thin fluorine resin film and the substrate 1 together by thermocompression at a pressure of about 300 to 700 kPa and a temperature of about 330 to 450° C.; and a method including attaching a thin fluorine resin film and the substrate 1 together via, for example, an adhesive. As the adhesive for attaching the thin fluorine resin film and the substrate 1 together there is preferably used a urethane or epoxy heat-resistant adhesive.

In the present invention, it is particularly preferable to form the fluorine resin layer 2 adhered directly to the substrate 1 without the use of an adhesive or another means. That is, the fluorine resin layer 2 is preferably formed of a fluorine resin adhered directly to the substrate 1. This allows obtaining the sheet for thin layer transfer 10 that is less prone to deterioration such as an increase in surface irregularities even when repeatedly subjected to thermocompression bonding. The method including applying a fluorine resin dispersion onto the substrate 1 and then performing drying and sintering to adhere the fluorine resin to the substrate 1 is particularly preferable since the method easily allows the sheet for thin layer transfer 10 to have a surface roughness Ra (Japanese Industrial Standards (JIS) B 0601-1994) of 1 µm or less. This method for producing the sheet for thin layer transfer 10 includes, for example, a step of providing the substrate 1, an immersion coating step, a heat drying step, and a sintering step. The immersion coating step is a step of immersing the substrate 1 in a dispersion of a fluorine resin. The heat drying step is a step of, after the immersion coating step, heating the sheet including the substrate 1 coated with the fluorine resin so as to remove the dispersion medium of the dispersion. The sintering step is a step of, after the heat drying step, heating the sheet including the substrate 1 coated with the fluorine resin at a temperature equal to or higher than the melting point of the fluorine resin.

If the immersion coating step of immersing the substrate 1 in a dispersion of a fluorine resin is performed in such a manner as to simultaneously coat both sides of the substrate 1 and is followed by drying and sintering, the edge faces of the substrate 1 can also be coated with the fluorine resin. This allows obtaining the sheet for thin layer transfer 10 that has an enhanced adhesion between the fluorine resin layer 2 and the substrate 1. In this case, the coating of the edge faces of the substrate 1 with the fluorine resin may be partial as long as the coating of the edge faces forms a connection between the two portions of the fluorine resin layer 2 which respectively cover the upper and lower sides in the principal plane of the substrate 1. It is preferable that two or more portions of the edge faces of the substrate 1 be coated with the fluorine resin, and it is more preferable that all of the edge faces of the substrate 1 be coated with the fluorine resin. The amount of the fluorine resin to be applied is determined by adjusting, for example, the solid content concentration in the dispersion of the fluorine resin appropriately depending on the required thickness of the fluorine resin layer 2. Coating only one side of the substrate 1 with a fluorine resin may be possible by means of performing the immersion coating step with a protective tape being attached to the other side of the substrate 1 and then peeling off the protective tape. The fluorine resin coating formed on the edge faces of the substrate 1 may be removed by cutting or abrasion as necessary.

The application of the dispersion of the fluorine resin is followed by the heat drying step to evaporate the dispersion medium. The heating temperature in the heat drying step may be determined as appropriate depending on the boiling point or amount of the dispersion medium. The heating temperature is about 80 to 150° C. when the dispersion medium used is water.

The heat drying step is followed by the sintering step. The heat drying step may be omitted, and the dispersion medium may be evaporated in the sintering step. The sintering step is required to accomplish heating of the fluorine resin to a temperature equal to or higher than the melting point of the fluorine resin component. Thus, the sintering temperature is preferably 300° C. or more and more preferably 330° C. or more. However, too high a sintering temperature is likely to cause thermal degradation or molecular weight reduction of the fluorine resin. The sintering temperature is thus preferably 450° C. or less and more preferably 400° C. or less. The heating time in the sintering step may be determined as appropriate depending on the product to be sintered and on the heating temperature. The heating time may be about 5 seconds to 30 minutes.

A sequence of steps consisting of the immersion coating step, the heat drying step, and the sintering step is preferably repeated two or more times to obtain a stack of two or more fluorine resin layers 2. Such a method allows reducing the surface irregularities of the sheet for thin layer transfer 10 and obtaining the fluorine resin layer 2 with enhanced strength. The number of the repetitions of the sequence of steps is about 2 to 5. It is not preferable to repeat the steps too many times since such many repetitions of the steps lead to a great thickness of the fluorine resin layer and large surface irregularities of the sheet for thin layer transfer 10.

The sheet for thin layer transfer 10 has a tensile elastic modulus of preferably 60 MPa or more, more preferably 70 MPa or more in both the MD direction (length direction) and the TD direction (width direction). This means success in obtaining the sheet for thin layer transfer 10 having high durability and capable of stably traveling between rolls during continuous production.

The arithmetic mean roughness Ra (JIS B 0601-1994) of the surface of the sheet for thin layer transfer 10 is preferably 1.5 μm or less, more preferably 1 μm or less, and even more preferably 0.7 μm or less. This allows fine, high-quality transfer of thin layers. The arithmetic mean roughness of the surface of the sheet for thin layer transfer 10 in the MD direction and TD direction of the sheet for thin layer transfer 10 is preferably 1.5 μm or less, more preferably 1.0 μm or less, and even more preferably 0.7 μm or less.

One exemplary product that can be produced using the sheet for thin layer transfer 10 of the present invention is a membrane electrode assembly (MEA) of a polymer electrolyte fuel cell. The sheet for thin layer transfer 10 can be suitably used in transfer and formation of an electrode catalyst layer of the membrane electrode assembly. A specific example of the membrane electrode assembly will now be described.

The membrane electrode assembly is, but not limited to, one composed of an electrolyte membrane such as a polymer electrolyte membrane and electrode catalyst layers sandwiching the electrolyte membrane. The electrode catalyst layer is a thin porous layer having pores with a diameter of 1 μm or less, and mainly contains catalytic material-supporting particles and a polymer electrolyte. The polymer electrolyte membrane used as the electrolyte membrane can be a commonly-known polymer electrolyte membrane such as a fluorine polymer electrolyte membrane and a hydrocarbon polymer electrolyte membrane.

The method for producing such a membrane electrode assembly includes, for example, a catalyst layer stacking step, an electrolyte membrane stacking step, a thermocompression bonding step, and a peeling step. The catalyst layer stacking step is a step of stacking an electrode catalyst layer including at least a polymer electrolyte and catalytic material-supporting particles on the sheet for thin layer transfer 10. The electrolyte membrane stacking step is a step of bringing an electrolyte membrane into contact with the electrode catalyst layer stacked on the sheet for thin layer transfer 10. The thermocompression bonding step is a step of bonding the electrode catalyst layer and the electrolyte membrane together by thermocompression. The peeling step is a step of peeling the sheet for thin layer transfer 10 from the electrode catalyst layer.

An example of the method for producing the electrode catalyst layer will now be described. First, a catalyst solution containing catalytic material-supporting particles and a polymer electrolyte dispersed in a solvent is applied to the surface formed by the fluorine resin layer 2 of the sheet for thin layer transfer 10 and then dried by heating at a temperature of about 30 to 180° C. to obtain a stack of the sheet for thin layer transfer 10 and the electrode catalyst layer 3 (an electrode catalyst layer-carrying sheet for thin layer transfer 11) as shown in FIG. 3. This step is referred to as the catalyst layer stacking step. The technique used for application of the catalyst solution can be a commonly-known technique such as a doctor blade technique, a dipping technique, a screen printing technique, a roll coating technique, and a spraying technique. Among these, the spraying technique is preferable since it allows obtaining the electrode catalyst layer 3 of high uniformity in which the particles are well dispersed. In the above manner, the electrode catalyst layer-carrying sheet for thin layer transfer 11 is produced which includes the sheet for thin layer transfer 10 and the electrode catalyst layer 3 for use in a membrane electrode assembly of a fuel cell, the electrode catalyst layer 3 being stacked on the sheet for thin layer transfer 10. As stated above, the electrode catalyst layer 3 includes at least a polymer electrolyte and catalytic material-supporting particles.

Next, the electrolyte membrane stacking step is performed to bring the electrode catalyst layer 3 of the above-prepared stack into close contact with the electrolyte membrane. This is followed by the thermocompression bonding step of joining the electrode catalyst layer 3 to the electrolyte membrane by heat press or by passage between a pair of heat rolls. The temperature for thermocompression bonding depends on the type of the electrolyte membrane and is thus not particularly limited. The temperature may be about 80 to 150° C. There may be used a technique of sandwiching the electrolyte membrane from both sides by two electrode catalyst layer-carrying sheets for thin layer transfer 11 and passing the sandwich assembly between a pair of heat rolls to form the electrode catalyst layers 3 simultaneously on both sides of the electrolyte membrane.

Figure 4:
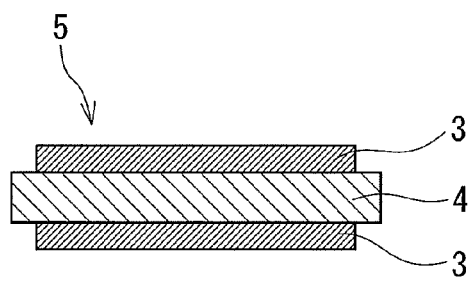
FIG. 4 is a cross-sectional view showing an example of the membrane electrode assembly produced using the sheet for thin layer transfer of the present invention.

Afterwards, the peeling step is performed to peel the sheet for thin layer transfer 10 from the electrode catalyst layer 3, thus obtaining a membrane electrode assembly 5 as shown in FIG. 4. The technique for the peeling is not particularly limited. A technique of continuously and automatically peeling the sheet for thin layer transfer 10 using a roll for winding up the sheet can be preferably used. The sheet for thin layer transfer 10 can be repeatedly used.

Figure 5:
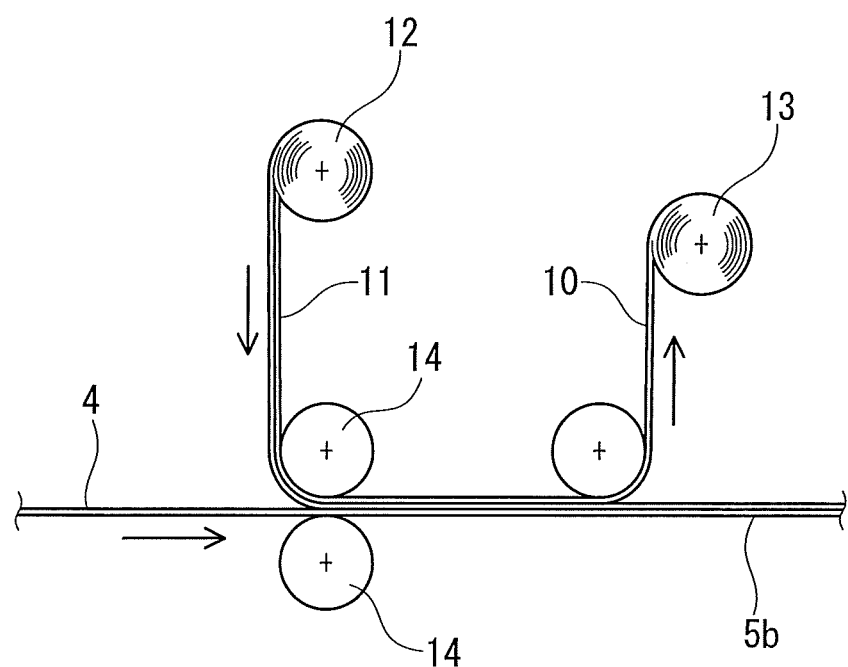
FIG. 5 is a diagram showing a part of the steps of the method of the present invention for producing a membrane electrode assembly.

FIG. 5 shows an example of the sequence of these steps. As shown in FIG. 5, the electrode catalyst layer-carrying sheet for thin layer transfer 11 delivered from a feed roll is passed between a pair of heating rolls 14, with the surface of the electrode catalyst layer 3 of the sheet being in contact with the electrolyte membrane 4, and thus the surface of the electrode catalyst layer 3 is firmly bonded to the electrolyte membrane 4. Then, the sheet for thin layer transfer 10 is only peeled off and wound on a recovery roll 13. Thus, a membrane electrode assembly 5b including the electrolyte membrane 4 having one side with the electrode catalyst layer 3 joined thereto can be produced in a continuous manner.

Examples of the catalytic material that can be used in the catalytic material-supporting particles include: platinum group elements such as platinum, palladium, ruthenium, iridium, rhodium, and osmium; metals such as iron, lead, copper, chromium, cobalt, nickel, manganese, vanadium, molybdenum, gallium, and aluminum; and alloys, oxides, and composite oxides of these metals. For these catalysts, having too large a particle diameter causes reduced activity, while having too small a particle diameter causes reduced stability. Thus, the particle diameter of the catalyst is preferably 0.5 to 20 nm and more preferably 1 to 5 nm. In particular, using particles of one or more metals selected from platinum, gold, palladium, rhodium, ruthenium, and iridium as the catalyst is beneficial for electrode reaction and allows an efficient, stable electrode reaction to take place. Thus, a polymer electrolyte fuel cell including an electrode catalyst layer containing such a catalyst shows good electricity generation characteristics. It is therefore preferable to use such a catalyst.

Carbon particles can be used as the particles supporting the catalytic material. The carbon particles are not particularly limited as long as they are fine particles, have electrical conductivity, and are not subject to erosion by the catalyst. There can be used carbon black, graphite, black lead, activated carbon, carbon fiber, carbon nanotube, or fullerene. The carbon particles with too small a particle diameter makes the formation of an electron conduction path less likely, while the carbon particles with too large a particle diameter may cause a reduction in the gas diffusion properties of the electrode catalyst layer or a decline in the use efficiency of the catalyst. Thus, the particle diameter of the carbon particles is preferably about 10 to 1000 nm and more preferably 10 to 100 nm.

The polymer electrolyte may be any one that has proton conductivity. Examples thereof include a fluorine polymer electrolyte material and a hydrocarbon polymer electrolyte material. Examples of the fluorine polymer electrolyte that can be used include Nafion (registered trademark) manufactured by DuPont. Examples of the hydrocarbon polymer electrolyte that can be used include electrolyte materials such as sulfonated polyetherketone, sulfonated polyethersulfone, sulfonated polyetherethersulfone, sulfonated polysulfide, and sulfonated polyphenylene. In particular, it is preferable to use a polymer electrolyte that is the same as the material of the electrolyte membrane, in view of adhesion to the electrolyte membrane.

The solvent used in the catalyst solution is not particularly limited as long as the solvent causes no erosion of the catalytic material-supporting particles or the polymer electrolyte and allows the polymer electrolyte to be dissolved with high flowability or dispersed in the form of microgels. Examples of the solvent used in the catalyst solution include: alcohols such as methanol, ethanol, 1-propanol, 2-propanol, 1-butanol, 2-butanol, isobutyl alcohol, tert-butyl alcohol, and pentanol; ketone solvents such as acetone, methyl ethyl ketone, pentanone, methyl isobutyl ketone, heptanone, cyclohexanone, methylcyclohexanone, acetonylacetone, and diisobutyl ketone; ether solvents such as tetrahydrofuran, dioxane, diethylene glycol dimethyl ether, anisole, methoxytoluene, and dibutyl ether; and other solvents such as dimethylformamide, dimethylacetamide, N-methylpyrrolidone, ethylene glycol, diethylene glycol, diacetone alcohol, and 1-methoxy-2-propanol. It is desirable for the solvent used in the catalyst solution to contain at least an organic solvent, particularly a volatile organic solvent. For example, a polar organic solvent is used. The solvent used in the catalyst solution may be a mixture of two or more of the above-mentioned solvents.

The catalyst solution may contain a dispersant in order to disperse the catalytic material-supporting particles. Examples of this dispersant include anionic surfactants, cationic surfactants, amphoteric surfactants, and nonionic surfactants. In particular, there are preferably used sulfonic acid-based surfactants such as alkylbenzene sulfonic acid, oil-soluble alkylbenzene sulfonic acid, α-olefin sulfonic acid, sodium alkylbenzene sulfonate, oil-soluble alkylbenzene sulfonate, and α-olefin sulfonate.

EXAMPLES

Hereinafter, the present invention will be described in detail by way of examples and comparative examples. It should be noted that the present invention is not limited to these examples.

Example 1

An aqueous dispersion (having a solid content of 60 weight % and a specific gravity of 1.52) of a commercially-available emulsion-polymerized PTFE resin (having a number-average molecular weight of $1.71 \times 10^7$ (molecular weight determined by a differential scanning calorimeter)) was prepared. A fluorine surfactant ($CF_3(CF_2)_7CH_2CH_2$—$(OCH_2CH_2)_m OH$, where m=3 to 5) was added to this aqueous dispersion in an amount of 0.67 weight % relative to the PTFE resin solid content. A fluorine resin dispersion was thus prepared. An aluminum foil (manufactured by Mitsubishi Aluminum Co., Ltd. and having a thickness of 60 μm) being conveyed between rolls at a speed of 0.7 m/minute was immersed in this fluorine resin dispersion, then dried at 100° C. and sintered at 350° C. The sheet including the aluminum foil was additionally immersed in the fluorine resin dispersion using the same conditions as for the first immersion, then dried and sintered using the same conditions as for the first drying and sintering. The two repetitions of the sequence of steps consisting of the immersion step, drying step, and sintering step yielded a sheet (having a thickness of 90 μm) including an aluminum foil coated with a fluorine resin. A sheet for thin layer transfer according to Example 1 was thus obtained.

Example 2

A sheet for thin layer transfer according to Example 2 was obtained in the same manner as in Example 1, except for using a polyimide sheet (manufactured by Ube Industries, Ltd. under the trade name Upilex-755) instead of the aluminum foil used in Example 1. The sheet for thin layer transfer according to Example 2 had a thickness of 105 μm.

Comparative Example 1

As a sheet for thin layer transfer according to Comparative Example 1 there was prepared a PTFE resin sheet, No. 900L-T (manufactured by Nitto Denko Corporation and having a thickness of 100 μm), produced by skiving a cylindrical block of a PTFE resin into a sheet form.

Comparative Example 2

As a sheet for thin layer transfer according to Comparative Example 2 there was prepared a resin sheet made of PFA, NEOFLON AF-0050 (manufactured by DAIKIN INDUSTRIES, LTD. and having a thickness of 50 μm).

The above sheets for thin layer transfer of Examples and Comparative Examples were subjected to the evaluations described below. The results are shown in Table 1.

(Measurement of Arithmetic Mean Roughness Ra)

The arithmetic mean roughness Ra of the surface of each of the sheets for thin layer transfer of Examples and Comparative Examples was measured using a surface roughness tester, Surftest SV-2100 (manufactured by Mitutoyo Corporation), according to JIS B 0601-1994. The measurement was performed under the following conditions to determine the surface roughness Ra in both the MD direction (length direction) and the TD direction (width direction): Measurement speed=2 mm/second, Measurement length=40 mm, Number of sections subjected to measurement=5.

(Measurement of Tensile Strength)

The tensile strength (tensile elastic modulus) of each of the sheets for thin layer transfer of Examples and Comparative Examples was measured using a tensile tester, AG-1 (manufactured by Shimadzu Corporation). The measurement was performed under the following conditions to determine the tensile strength (tensile elastic modulus) in both the MD direction (length direction) and the TD direction (width direction): Sample size=Punched specimen of No. 3 dumbbell shape, Tensile rate=200 mm/minute.

TABLE 1

|  | Arithmetic mean roughness Ra [μm] | | Tensile strength [MPa] | |
|---|---|---|---|---|
|  | MD direction | TD direction | MD direction | TD direction |
| Example 1 | 0.44 | 0.57 | 78 | 71 |
| Example 2 | 0.03 | 0.03 | 110 | 110 |
| Comp. Example 1 | 1.08 | 2.48 | 58 | 55 |
| Comp. Example 2 | 0.44 | 1.12 | 30 | 27 |

As shown in Table 1, comparison of the sheets for thin layer transfer according to Example 1 and Example 2 with the sheets for thin layer transfer according to Comparative Example 1 and Comparative Example 2 reveals that the surfaces of the sheets for thin layer transfer according to Example 1 and Example 2 had a smaller arithmetic mean roughness Ra than the surfaces of the sheets for thin layer transfer according to Comparative Example 1 and Comparative Example 2 in at least one of the MD and TD directions. The tensile strengths of the sheets for thin layer transfer according to Example 1 and Example 2 are greater than the tensile strengths of the sheets for thin layer transfer according to Comparative Example 1 and Comparative Example 2 in the MD and TD directions.

The arithmetic mean roughness Ra of the surface of a sheet for thin layer transfer is preferably 1 μm or less and more preferably 0.75 μm or less in both the MD direction and the TD direction. The sheets for thin layer transfer according to Example 1 and Example 2 successfully have a surface with a significantly reduced arithmetic mean roughness Ra. This leads to a reduction in surface irregularities of a transferred thin layer, thus resulting in a reduced incidence of defects such as electrical short circuit.

Additionally, the tensile strength of the sheet for thin layer transfer of the present invention is preferably 60 MPa or more and more preferably 70 MPa or more in both the MD direction and the TD direction. The sheets for thin layer transfer according to Example 1 and Example 2 successfully have an increased tensile strength, which can lead to a reduction in deformation or deterioration of the sheets for thin layer transfer caused by conveyance between rolls or by repetition of thermocompression and also lead to a reduction in the amount of wobbling (shaking) of the sheets being conveyed.

INDUSTRIAL APPLICABILITY

The sheet for thin layer transfer of the present invention can be preferably used, for example, in transfer of an electrode catalyst layer for a MEA by thermocompression bonding.

The invention claimed is:

1. A sheet for thin layer transfer, comprising:
   a substrate comprising a metal film or a heat-resistant resin film that is capable of withstanding a temperature of 350 degrees Celsius; and
   a fluorine resin layer provided on at least one side of the substrate, the fluorine resin layer formed of a fluorine resin sintered at a temperature equal to or higher than a melting point of the fluorine resin, the fluorine resin containing polytetrafluoroethylene having a number-average molecular weight of 5,000,000 or more, and the fluorine resin layer directly adhered to the metal film or the heat-resistant resin film, wherein
   the fluorine resin layer is configured to remain in the sheet after thermocompression of the sheet,
   the sheet is configured such that the fluorine resin layer remains on the at least one side of the substrate when the sheet is immersed in acetone, and
   the sheet satisfies at least one of following conditions (A) and (B):
   (A) the substrate is a polyimide film, and
   (B) the sheet has a tensile strength of 60 MPa or more.

2. The sheet for thin layer transfer according to claim 1, wherein the fluorine resin layer is provided on both sides of the substrate.

3. The sheet for thin layer transfer according to claim 2, wherein the fluorine resin layer is formed so as to have two portions respectively provided on both sides of the substrate, the two portions being connected to each other.

4. The sheet for thin layer transfer according to claim 1, wherein the substrate is an aluminum film or a stainless steel film.

5. The sheet for thin layer transfer according to claim 1, wherein the substrate is a polyimide film.

6. The sheet for thin layer transfer according to claim 1, having a surface formed by the fluorine resin layer, the surface having an arithmetic mean roughness Ra of 1 μm or less, and the arithmetic mean roughness Ra being measured by a method according to JIS B 0601-1994.

7. The sheet for thin layer transfer according to claim 1, having a tensile strength of 60 MPa or more.

8. An electrode catalyst layer-carrying sheet for thin layer transfer, comprising:
   the sheet for thin layer transfer according to claim 1; and
   an electrode catalyst layer for use in a membrane electrode assembly of a fuel cell, the electrode catalyst layer being stacked on the sheet for thin layer transfer.

9. The electrode catalyst layer-carrying sheet for thin layer transfer according to claim 8, wherein the electrode catalyst layer comprises at least a polymer electrolyte and catalytic material-supporting particles.

10. A method for producing a sheet for thin layer transfer, the method comprising:

a step of providing a substrate including a metal film or a heat-resistant resin film that is capable of withstanding a temperature of 350 degrees Celsius;

an immersion coating step of immersing the substrate in a dispersion of a fluorine resin, the fluorine resin containing polytetrafluoroethylene having a number-average molecular weight of 5,000,000;

a heat drying step of, after the immersion coating step, heating a sheet including the substrate coated with the fluorine resin so as to remove a dispersion medium of the dispersion; and a sintering step of, after the heat drying step, heating the sheet at a temperature equal to or higher than a melting point of the fluorine resin to form a fluorine resin layer that is directly adhered to the metal film or the heat-resistant resin film, wherein the fluorine resin layer is configured to remain in the sheet after thermocompression of the sheet, the fluorine resin layer is configured to remain on the at least one side of the substrate when the sheet immersed in acetone, and the sheet satisfies at least one of following conditions (A) and (B):

(A) the substrate is a polyimide film, and (B) the sheet has a tensile strength of 60 MPa or more.

11. The method for producing a sheet for thin layer transfer according to claim 10, comprising two to five repetitions of a sequence of steps consisting of the immersion coating step, the heat drying step, and the sintering step.

12. A method for producing a membrane electrode assembly, the method comprising:

a catalyst layer stacking step of stacking an electrode catalyst layer including at least a polymer electrolyte and catalytic material-supporting particles on the sheet for thin layer transfer according to claim 1;

an electrolyte membrane stacking step of bringing an electrolyte membrane into contact with the electrode catalyst layer stacked on the sheet for thin layer transfer;

a thermocompression bonding step of bonding the electrode catalyst layer and the electrolyte membrane together by thermocompression; and a peeling step of peeling the sheet for thin layer transfer from the electrode catalyst layer.

* * * * *